Patented Aug. 26, 1930

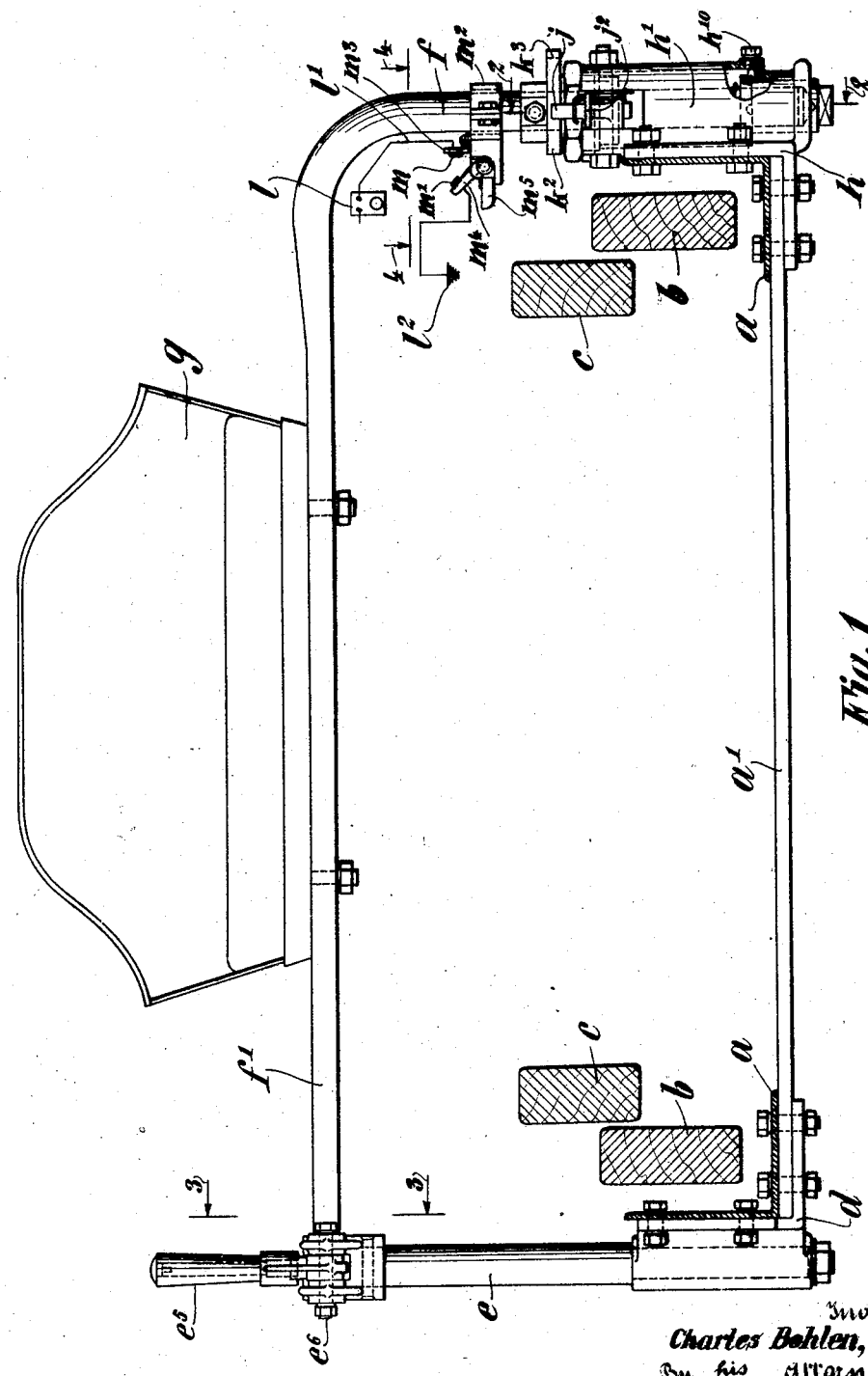

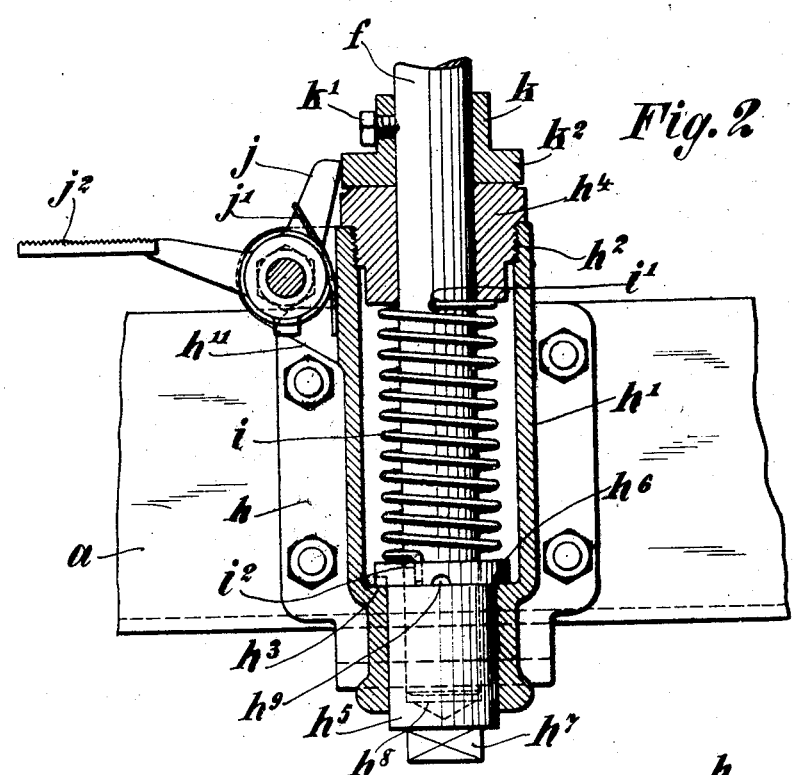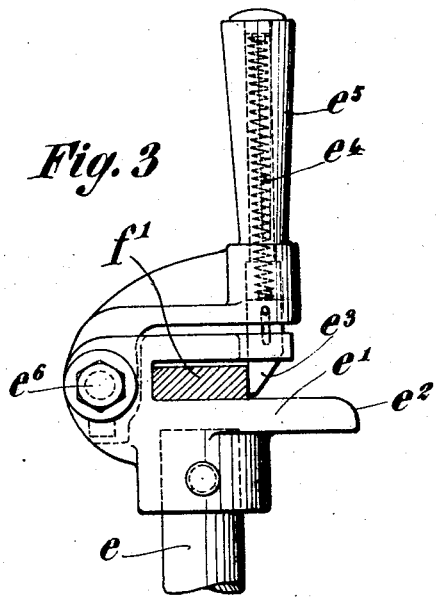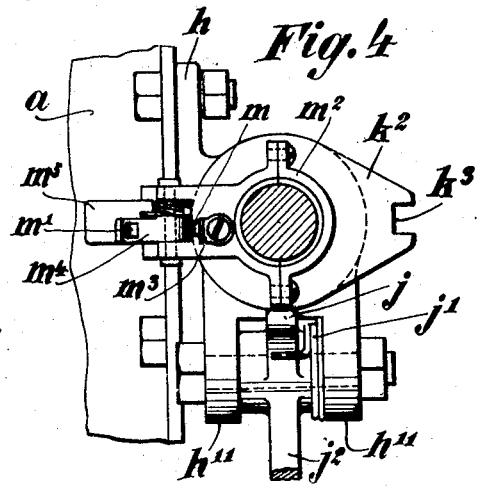

1,774,194

UNITED STATES PATENT OFFICE

CHARLES BOHLEN, JR., OF NEW YORK, N. Y., ASSIGNOR TO INTERNATIONAL MOTOR COMPANY, OF NEW YORK, N. Y., A CORPORATION OF DELAWARE

SUPPORT FOR TILLERMEN'S SEATS

Application filed July 3, 1929. Serial No. 375,687.

The present invention relates to seat constructions and supports therefor and embodies, more specifically, an improved form of tillerman's seat for use on trailers which carry fire ladders.

In service of this character the trailer is quite long and the rear truck thereof is a considerable distance from the fifth wheel connection between the tractor and the trailer. In order to facilitate the manoeuvering of the vehicle, the rear truck is constructed in such manner that it may be steered and the tillerman or person steering the rear truck is seated directly over the truck and in back of the steering wheel therefor. In this manner, the tillerman is located directly above the ladder which lies in the median line of the trailer and must be removed before the ladder can be elevated. It becomes quite desirable, therefore, to provide a tillerman's seat support which is readily movable into steering position, as well as being capable of movement out of the path of the ladder during elevation thereof.

An object of the present invention, accordingly, is to provide a support for a tillerman's seat which may be readily moved into a steering position as well as into a position out of the path of the ladder during elevation thereof.

A further object of the invention is to provide a means for automatically preventing elevation of the ladder while the seat is in a steering position.

A further object of the invention is to provide a mechanism which when released, causes the seat to be moved immediately to a position out of the path of the ladder during its elevation.

Further objects of the invention will be apparent as it is described in greater detail in connection with the accompanying drawings, wherein:

Figure 1 is a view in front elevation, taken in section through the fire ladder and trailer frame and showing the seat support constructed in accordance with the present invention.

Figure 2 is a view in section, taken on line 2—2 of Figure 1, and looking in the direction of the arrows.

Figure 3 is a view in section, taken on line 3—3 of Figure 1, and looking in the direction of the arrows.

Figure 4 is a view in section taken on line 4—4 of Figure 1, and looking in the direction of the arrows.

Referring to the above drawings, $a$ designates the frame members of a trailer carrying ladder sections $b$ and $c$. A cross frame member $a'$ serves as a brace and a bracket $d$ is secured to the left hand frame member $a$ and cross member $a'$ as clearly shown in Figure 1. This bracket carries a stationary pedestal $e$ upon the upper end of which a jaw $e'$ is secured. The lower jaw member is formed with a sloping face $e^2$ to serve as a guide for the extremity of a cross arm $f'$ formed on a seat pedestal $f$. The arm $f'$ carries the tillerman's seat $g$ and, as described above, rides up over the lower jaw member and is latched in the position shown in Figure 3 by a spring actuated detent $e^3$ which is part of the jaw member $e^5$. Spring $e^4$ is mounted within a handle formed on the jaw member $e^5$ which is pivoted to the jaw member $e'$ at $e^6$. The detent is carried in the lower extremity of the handle $e^5$ and is urged downwardly by the spring $e^4$.

Upon the right hand frame member $a$, a bracket $h$ is secured, the bracket being formed with a pedestal support $h'$ which is internally threaded at its upper extremity $h^2$, and formed with an inwardly extending annular shoulder $h^3$ adjacent the lower extremity thereof. A bearing plug $h^4$ is threaded in the upper extremity of the pedestal support and a bearing plug $h^5$, having an annular flange $h^6$, is carried within the pedestal support at the lower extremity thereof, the annular flange $h^6$ being seated upon the shoulder $h^3$ as clearly shown in Figure 2. A squared section $h^7$ is formed on the plug in order that a tool may be applied to turn the plug with respect to the bearing support $h'$.

The bearing plug $h^5$ is formed with an axial recess $h^8$ within which the lower extremity of the seat pedestal $f$ is received. A helical spring $i$ is secured at its upper end $i'$ to the pedestal $f$, while the lower end $i^2$ is secured to the bearing plug $h^5$. Radial recesses $h^9$ are formed in the flange $h^6$ and plug $h^{10}$ is threaded in the pedestal support to engage a suitably positioned recess $h^9$ upon turning of the bearing plug to the proper position. In this manner, the tension of the spring $i$ may be adjusted as desired. When the arm $f'$ with seat $g$ are moved out of the path of the ladders, the seat pedestal $f$ is held in this position by means of a latch $j$ which is pivoted between spaced arms $h^{11}$ on the pedestal support $h'$. A spring $j'$ normally urges the latch toward the pedestal support and a pedal $j^2$ is provided for releasing the latch when it is desired to move the seat into its steering position. A collar $k$ is secured to the seat pedestal $f$ by means of a bolt $k'$ and is formed with a flange $k^2$ having a recess $k^3$. The manner in which the latch is operated will be readily apparent since the latch member $j$ will engage the recess $k^3$ automatically when the seat is moved into a plane parallel with the median plane of the ladders.

The ladders are elevated by power delivered by the engine for propelling the tractor. In order that the ladders may not be elevated while the seat is in a steering position, an automatic safety device has been incorporated in the structure for supporting the seat. This safety device comprises a means for cutting off the engine ignition should the ladders be elevated while the seat is so disposed. Referring to Figure 1, the engine magneto is diagrammatically shown at $l$, being connected through circuit $l'$ to a ground $l^2$. A stationary switch contact $m$ and a movable contact $m'$ are interposed in this magneto ground circuit and carried by a bracket $m^2$ which is mounted on the rotatable pedestal $f$. Stationary contact $m$ is mounted on an arm $m^3$, while movable contact $m'$ is carried by an arm $m^4$ which is pivoted upon the bracket $m^2$. An operating arm $m^5$ is formed on the arm $m^4$ and lies in the path of the ladder section $b$ when the seat is in the position shown in Figure 1. Under these conditions, contacts $m$ and $m'$ are open and the ground is removed from the magneto. If the ladder section $b$ is elevated before the tillerman's seat $g$ is moved out of the path of the ladder, the ladder section $b$ engages operating arm $m^5$ and closes contacts $m$ and $m'$ to ground the magneto, thus shutting off the power and preventing further elevation of the ladder until the tillerman's seat is moved into a non-steering position. From the foregoing description, it will be seen that the invention includes, not only an improved form of tillerman's seat support which affords means for holding the seat in either a steering or non-steering position, but there is incorporated in the seat structure an auxiliary safety device for preventing injury to the parts by reason of the elevation of the ladder before the seat is moved into a non-steering position. The spring $i$ normally urges the seat into a non-steering position, thus requiring only the releasing of latch $e^3$, to effect such operation positively and the seat is maintained in such position by the latch $j$. It thus requires positive manual operation to move the seat into a steering position although, when there, the seat is held by the latch $e^3$.

While the invention has been described in connection with the specific construction shown in the accompanying drawings, it is not to be limited, save as defined in the appended claims.

I claim as my invention:

1. In combination with a magneto grounding circuit, a rotatable pedestal for a tillerman's seat, and an elevating ladder, a bracket carried by the pedestal, a stationary contact carried by the bracket and connected in the circuit, an arm pivoted to the bracket and extending in the path of the ladder, and a movable contact on the arm and connected in the circuit, whereby elevation of the ladder when the seat is in a normal position will close the contacts to ground the magneto.

2. In combination with an electrical circuit, a rotatable seat pedestal and a means movable through the position normally occupied by the seat, a bracket carried by the pedestal, a stationary contact carried by the bracket and connected in the electrical circuit, a pivoted arm carried by the bracket and lying in the path of the movable means, and a contact on the arm connected in the electrical circuit and cooperating with the first contact to close the circuit upon movement of the movable means when the seat is in a normal position.

3. In combination with an electrical circuit, a rotatable seat pedestal and a means movable through the position normally occupied by the seat, a bracket carried by the pedestal, a stationary contact carried by the bracket and connected in the electrical circuit, a movable contact carried by the bracket and connected in the circuit, and means to position the movable contact in the path of the movable means.

This specification signed this 28th day of June, A. D. 1929.

CHARLES BOHLEN, Jr.